US009937618B2

(12) United States Patent
Saunders et al.

(10) Patent No.: US 9,937,618 B2
(45) Date of Patent: Apr. 10, 2018

(54) HYBRID HYDRAULIC AND ELECTRICALLY ACTUATED MOBILE ROBOT

(71) Applicant: Google Inc., Mountain View, CA (US)

(72) Inventors: John Aaron Saunders, Mountain View, CA (US); Alex Khripin, Mountain View, CA (US); Steven Potter, Mountain View, CA (US); Michael Patrick Murphy, Mountain View, CA (US); Christopher Everett Thorne, Mountain View, CA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 15/016,729

(22) Filed: Feb. 5, 2016

(65) Prior Publication Data

US 2016/0151911 A1    Jun. 2, 2016

Related U.S. Application Data

(63) Continuation of application No. 14/449,471, filed on Aug. 1, 2014, now Pat. No. 9,283,949.

(Continued)

(51) Int. Cl.
*B25J 9/00*    (2006.01)
*B25J 9/12*    (2006.01)
(Continued)

(52) U.S. Cl.
CPC ............... *B25J 9/126* (2013.01); *B25J 3/04* (2013.01); *B25J 9/144* (2013.01); *B60W 10/04* (2013.01);
(Continued)

(58) Field of Classification Search
CPC .. B25J 3/04; B25J 9/144; B25J 9/126; B60W 10/08; B60W 10/04; B62D 57/02;
(Continued)

(56) References Cited

U.S. PATENT DOCUMENTS 4,782,258 A    11/1988 Petrosky et al.
5,159,988 A    11/1992 Gomi et al.
(Continued)

OTHER PUBLICATIONS

International Search Report for corresponding PCT application No. PCT/US2015/041335, dated Oct. 15, 2015.

*Primary Examiner* — Jason Holloway
(74) *Attorney, Agent, or Firm* — Honigman Miller Schwartz and Cohn LLP

(57) ABSTRACT

Example embodiments may relate to a robotic system that includes a hydraulic actuator and an electric actuator both coupled to a joint of the robotic system. Operation of the actuators may be based on various factors such as based on desired joint parameters. For instance, such desired joint parameters may include a desired output torque/force of the joint, a desired output velocity of the joint, a desired acceleration of the joint, and/or a desired joint angle, among other possibilities. Given a model of power consumption as well as a model of the actuators, the robotic system may determine operating parameters such as hydraulic and electric operating parameters as well as power system parameters, among others. The robotic system may then control operation of the actuators, using the determined operating parameters, to obtain the desired joint parameters such that power dissipation in the system is minimized (i.e., maximizing actuation efficiency).

15 Claims, 12 Drawing Sheets

Related U.S. Application Data

(60) Provisional application No. 62/027,517, filed on Jul. 22, 2014.

(51) Int. Cl.

| | | |
|---|---|---|
| *B25J 3/04* | (2006.01) | |
| *B25J 9/14* | (2006.01) | |
| *B60W 10/04* | (2006.01) | |
| *B60W 10/08* | (2006.01) | |
| *B62D 57/02* | (2006.01) | |
| *F15B 15/08* | (2006.01) | |
| *B62D 57/032* | (2006.01) | |
| *F15B 9/09* | (2006.01) | |
| *F15B 18/00* | (2006.01) | |

(52) U.S. Cl.
CPC .............. *B60W 10/08* (2013.01); *B62D 57/02* (2013.01); *B62D 57/032* (2013.01); *F15B 15/088* (2013.01); *F15B 9/09* (2013.01); *F15B 18/00* (2013.01); *F15B 2211/7135* (2013.01); *F15B 2211/78* (2013.01); *Y10S 901/01* (2013.01); *Y10S 901/22* (2013.01); *Y10S 901/23* (2013.01)

(58) Field of Classification Search
CPC ... B62D 57/032; Y10S 901/01; Y10S 901/23; Y10S 901/22; F15B 9/09; F15B 15/088; F15B 18/00; F15B 2211/7135; F15B 2211/78

See application file for complete search history.

(56) References Cited

U.S. PATENT DOCUMENTS

| | | |
|---|---|---|
| 5,656,903 A | 8/1997 | Shui et al. |
| 6,755,375 B2 | 6/2004 | Trikha |
| 8,126,592 B2 | 2/2012 | Saunders et al. |
| 8,172,174 B2 | 5/2012 | Hejda |
| 8,457,830 B2 | 6/2013 | Goulding |
| 8,535,499 B2 | 9/2013 | Blauw et al. |
| 8,630,763 B2 | 1/2014 | Goulding |
| 8,873,831 B2 | 10/2014 | Ahn et al. |
| 9,089,968 B2 | 7/2015 | Goulding |
| 9,545,078 B1* | 1/2017 | Yadin .................... A01J 5/017 |
| 2003/0116363 A1 | 6/2003 | Villedieu |
| 2005/0188687 A1 | 9/2005 | Meyer |
| 2006/0116783 A1* | 6/2006 | Aghili .................. F15B 21/087 700/97 |
| 2007/0233279 A1 | 10/2007 | Kazerooni |
| 2010/0090638 A1 | 4/2010 | Saunders |
| 2011/0196509 A1 | 8/2011 | Jansen et al. |
| 2011/0217154 A1 | 9/2011 | Montonaga |
| 2011/0231050 A1 | 9/2011 | Goulding |
| 2012/0253610 A1* | 10/2012 | Anders ................. E02F 9/2091 701/50 |
| 2012/0291873 A1 | 11/2012 | Potter et al. |
| 2013/0011220 A1 | 1/2013 | Jacobsen |
| 2013/0238183 A1* | 9/2013 | Goulding ............ B62D 57/024 701/26 |
| 2014/0076440 A1 | 3/2014 | Chailka |
| 2015/0286221 A1 | 10/2015 | Goulding |
| 2015/0321342 A1* | 11/2015 | Smith .................... B25J 9/0009 74/490.03 |

\* cited by examiner

HYBRID HYDRAULIC AND ELECTRICALLY ACTUATED MOBILE ROBOT

CROSS REFERENCE TO RELATED APPLICATION

The present application claims priority to U.S. patent application Ser. No. 14/449,471, filed on Aug. 1, 2014 and entitled "Hybrid Hydraulic and Electrically Actuated Mobile Robot," which is hereby incorporated by reference in its entirety. U.S. patent application Ser. No. 14/449,471 then claims priority to U.S. Provisional patent application Ser. No. 62/027,517 filed on Jul. 22, 2014 and entitled "Hybrid Hydraulic and Electrically Actuated Mobile Robot," which is hereby incorporated by reference in its entirety.

BACKGROUND

Unless otherwise indicated herein, the materials described in this section are not prior art to the claims in this application and are not admitted to be prior art by inclusion in this section.

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for efficient robotic systems becomes apparent. Therefore, a demand for efficient robotic systems has helped open up a field of innovation in actuators, sensing techniques, as well as component design and assembly.

SUMMARY

Example embodiments may relate to a robotic system that includes a hydraulic actuator and an electric actuator. Both actuators may be coupled to the same joint of the robotic system. Alternatively, each actuator may be coupled to a different joint of the robotic system. Operation of the actuators may be determined based on various factors such as the load applied at the joint, meeting a desired force/torque profile, required velocity of operation, experiencing shock loads, contact of a robot leg with the ground, and carrying objects, among other possibilities. Such a hybrid hydraulic and electrically actuated robotic system may lead to increased efficiency, control, and robustness.

In one aspect, a system is provided. The system includes a hydraulic actuator coupled to a joint of a mobile robotic device. The system also includes an electric actuator coupled to the joint of the mobile robotic device, where the electric actuator is configured for operation. The system further includes a controller configured to operate the hydraulic actuator and the electric actuator. In particular, the controller is also configured to determine a total output torque to be applied by the hydraulic actuator and the electric actuator and a total output velocity to be applied by the hydraulic actuator and the electric actuator. The controller is additionally configured to, based at least in part on the total output torque and the total output velocity, determine hydraulic operating parameters and electric operating parameters such that power dissipation of the hydraulic actuator and power dissipation of the electric actuator is minimized. The controller is further configure to determine that the hydraulic operating parameters indicate activation of the hydraulic actuator. The controller is yet further configured to, based at least in part on determining that the hydraulic operating parameters indicate activation of the hydraulic actuator, activate the hydraulic actuator for operation at the determined hydraulic operating parameters while operating the electric actuator at the determined electric operating parameters.

In another aspect, a second system is provided. The system includes a hydraulic actuator coupled to a joint of a mobile robotic device, where the hydraulic actuator is configured for operation. The system also includes an electric actuator coupled to the joint of the mobile robotic device. The system further includes a controller. The controller is configured to operate the hydraulic actuator and the electric actuator. The controller is also configured to determine a total output torque to be applied by the hydraulic actuator and the electric actuator and a total output velocity to be applied by the hydraulic actuator and the electric actuator. The controller is additionally configured to, based at least in part on the total output torque and the total output velocity, determine hydraulic operating parameters and electric operating parameters such that power dissipation of the hydraulic actuator and power dissipation of the electric actuator is minimized. The controller is further configured to determine that the electric operating parameters indicate activation of the electric actuator. The controller is yet further configured to, based at least in part on determining that the electric operating parameters indicate activation of the electric actuator, activate the electric actuator for operation at the determined electric operating parameters while operating the hydraulic actuator at the determined hydraulic operating parameters.

In yet another aspect, a method is provided. The method is operable in a robotic system that includes a hydraulic actuator and an electric actuator both coupled to a joint of the robotic system. The method involves determining, by a controller, a total output torque to be applied by the hydraulic actuator and the electric actuator and a total output velocity to be applied by the hydraulic actuator and the electric actuator. The method also involves, based at least in part on the total output torque and the total output velocity, determining, by the controller, hydraulic operating parameters and electric operating parameters such that power dissipation of the hydraulic actuator and power dissipation of the electric actuator is minimized. The method additionally involves determining, by the controller, that the hydraulic operating parameters indicate activation of the hydraulic actuator and that the electric operating parameters indicate activation of the electric actuator. The method further involves, based at least in part on determining that the hydraulic operating parameters indicate activation of the hydraulic actuator and that the electric operating parameters indicate activation of the electric actuator, activating the hydraulic actuator for operation at the determined hydraulic operating parameters activating the electric actuator for operation at the determined electric operating parameters.

In yet another aspect, a third system is provided. The system may include a hydraulic actuator and an electric actuator both coupled to a joint of the robotic system. The system may also include means for determining a total output torque to be applied by the hydraulic actuator and the electric actuator and a total output velocity to be applied by the hydraulic actuator and the electric actuator. The system may also include means for, based at least in part on the total output torque and the total output velocity, determining hydraulic operating parameters and electric operating parameters such that power dissipation of the hydraulic actuator and power dissipation of the electric actuator is minimized. The system may also include means for determining that the hydraulic operating parameters indicate activation of the hydraulic actuator and that the electric operating parameters indicate activation of the electric actuator. The system may also include means for, based at least in part on determining that the hydraulic operating parameters indicate activation of the hydraulic actuator and that the electric operating parameters indicate activation of the electric actuator, activating the hydraulic actuator for operation at the determined hydraulic operating parameters activating the electric actuator for operation at the determined electric operating parameters.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

According to various embodiments, described herein are systems and methods involving a hybrid hydraulic and electrically actuated robotic system, such as a mobile robot. An actuator is a mechanism that may be used to introduce mechanical motion. In robotic systems, actuators may be configured to convert stored energy into movement of various parts of the robotic system. For example, in humanoid or quadrupedal robots, actuators may be responsible for movement of robotic arms, legs, hands, and head, among others.

Additionally, various mechanisms may be used to power an actuator. For instance, actuators may be powered by chemicals, compressed air, or electricity, among other possibilities. Further, in some cases, an actuator may be a rotary actuator that may be used in systems involving rotational forms of motion (e.g., a joint in a humanoid robot). However, in other cases, an actuator may be a linear actuator that may be used in systems involving straight line motion.

The disclosed robotic system may include an electric actuator and a hydraulic actuator coupled to, for example, the same joint in the robotic system. The electric actuator and the hydraulic actuator may each exhibit different characteristics during operation. As such, the robotic system may also include an on-board computing system configured to control operation of each actuator in various situations in order to take advantage of the different characteristics, thereby resulting in increased efficiency, among other possible advances.

II. Example Hybrid Hydraulic and Electric Actuation in a Robotic System

Figure 1:
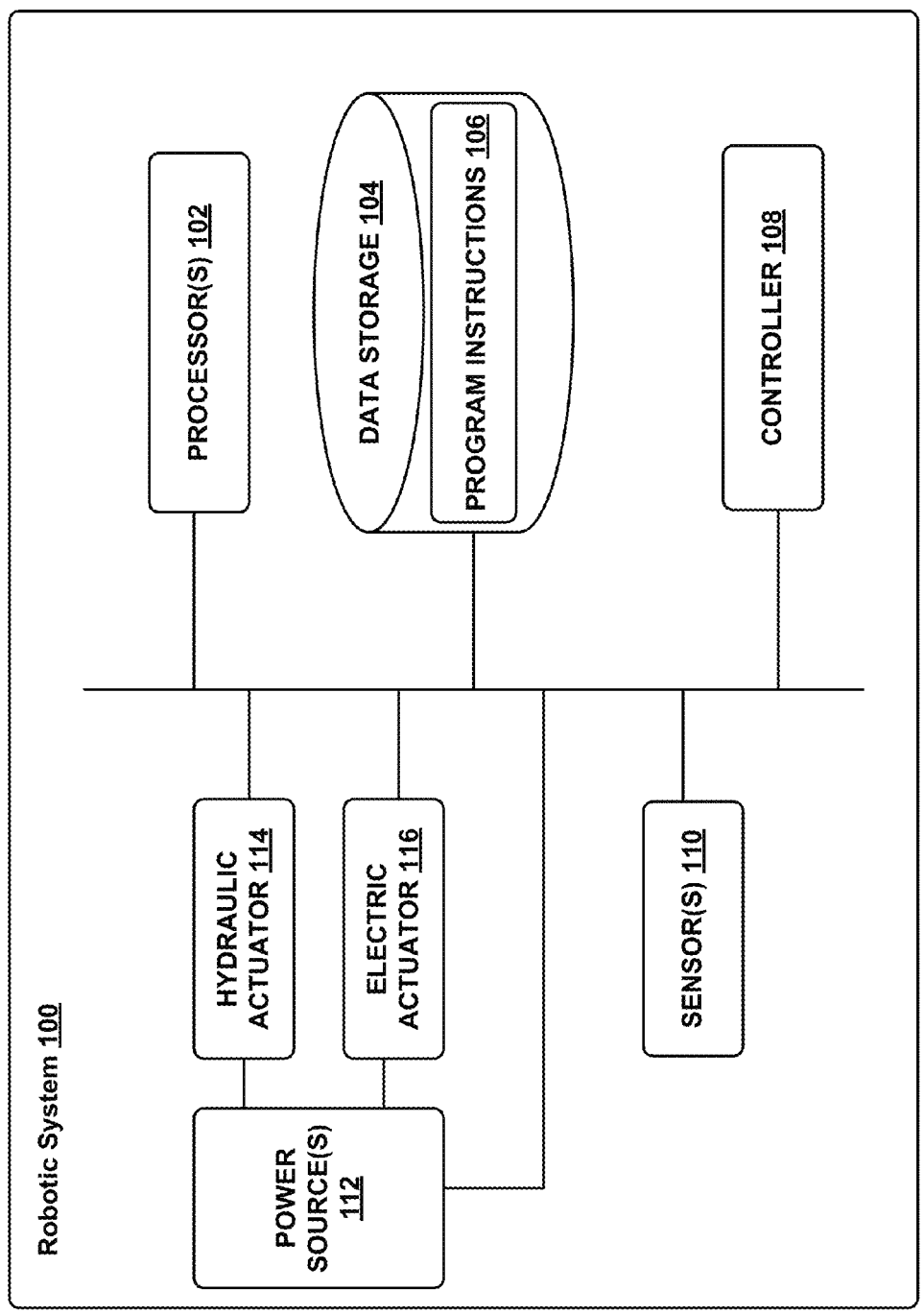
FIG. 1 illustrates an example configuration of a robotic system, according to an example embodiment.

Referring now to the figures, FIG. 1 shows an example configuration of a robotic system 100. The robotic system 100 may be a humanoid robot or a quadrupedal robot, among other examples. Additionally, the robotic system 100 may also be referred to as a mobile robotic device or robot, among others.

The robotic system 100 is shown to include processor(s) 102, data storage 104, program instructions 106, controller 108, sensor(s) 110, power source(s) 112, hydraulic actuator 114, and electric actuator 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to cause activation of and halt actuation by the hydraulic actuator 114 and the electric actuator 116.

Note that activation of the actuators may include increasing commands (e.g., more torque), turning on an actuator, or connecting an actuator to the system (e.g., engaging using clutch). In contrast, halting actuation by the actuators may include decreasing commands (e.g., less torque), turning off an actuator (e.g., coasting), or disconnecting an actuator from the system (e.g., disengaging using clutch).

The data storage 104 may include or take the form of one or more computer-readable storage media that can be read or accessed by processor(s) 102. The one or more computer-readable storage media can include volatile and/or nonvolatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensor, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for activation and halting actuation of the actuators 114 and 116 by controller 108 as further discussed below.

Further, the robotic system 100 may also include one or more power source(s) 112 configured to supply power to various components of the robotic system 100. In some cases, hydraulic actuator 114 and electric actuator 116 may each connect to a different power source. In other cases, both actuators 114 and 116 may be powered by the same power source. Any type of power source may be used such as, for example, a gasoline engine or a battery. Other configurations may also be possible.

Referring now to the actuators, hydraulic actuator 114 and electric actuator 116 may take on any form and may be positioned anywhere in the robotic system 100 to cause movement of various parts of the system such as, for example, legs and hands of a humanoid robot. While embodiments disclosed herein are discussed in the context of a single hydraulic actuator 114 and a single electric actuators 116, any number and types of actuators may be used without departing from the scope of the invention.

Hydraulic actuator 114 may include a hollow cylindrical tube in which a piston can move based on a pressure difference between two sides of the piston. The force exerted by hydraulic actuator 114 may be dependent on the pressure applied on a surface area of the piston. Since the surface area is finite, a change in pressure may result in change of force exerted by the hydraulic actuator 114.

Changing pressure in the hydraulic actuator 114 may be done by throttling fluid. More specifically, the fluid may enter the cylinder via an orifice and the flow of the fluid may be managed by a valve. Once the desired amount of fluid enters the cylinder, the valve may be closed such that a load may be supported by the hydraulic actuator 114 without using much (or any) additional power (e.g., a mobile robot holding position). As such, a hydraulic actuator 114 may be particularly advantageous for handling higher loads as well as shock loads.

Additionally, the speed at which the hydraulic actuator 114 operates may depend on the flow rate of the fluid. In order to operate at high speeds regardless of the required force, a larger power input may be needed. Therefore, a hydraulic actuator 114 operating at high speeds and low forces may be inefficient. Other example configurations of the hydraulic actuator 114 may also be possible.

In contrast, electric actuator 116 may allow for efficient operation at higher speeds and inefficient operation when exerting a high force at low speeds. In particular, electric actuator 116 may include a rotor, a stator, and a shaft, among other components. The rotor may include conductors configured to carry currents that interact with a magnetic field of the stator such that forces are generated to cause a mechanical rotation of the shaft. However, other example configurations of the electric actuator 116 may also be possible.

Unlike hydraulic actuator 114, in order to support a load while operating at low speeds (or holding position), electric actuator 116 may need to exert higher torque. As such, a large energy input may be needed to produce little (or no) mechanical motion, thereby leading to inefficiency in the operation of the electric actuator 116.

Figure 2:
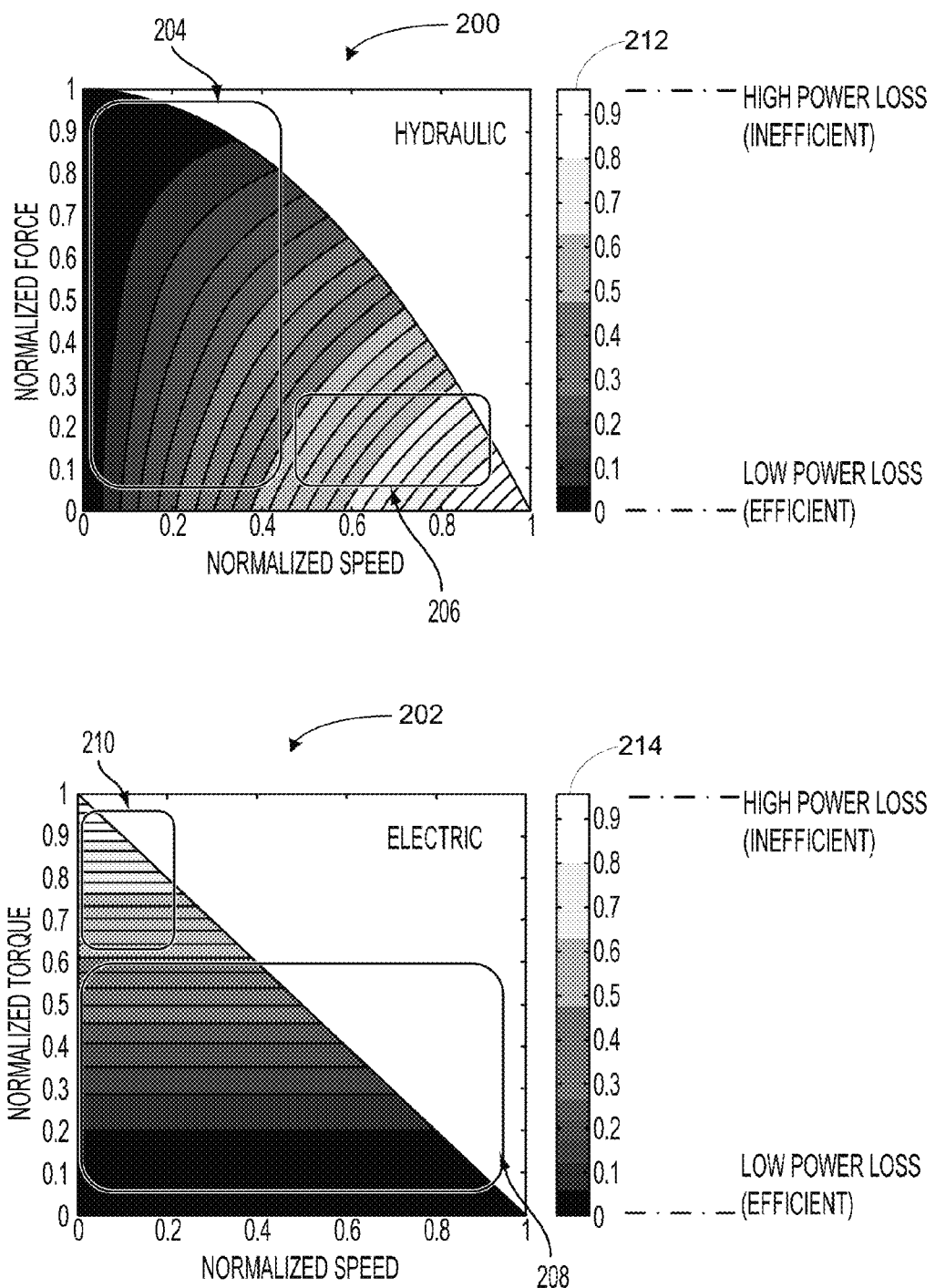
FIG. 2 illustrates example efficiency plots for hydraulic actuators and electric actuators, according to an example embodiment.

To further evaluate the differences between hydraulic actuator 114 and electric actuator 116, consider FIG. 2 illustrating example efficiency plots 200 and 202. Efficiency plot 200 illustrates how efficiency may vary, for traditional hydraulic actuators, depending on the applied force as well as the speed of operation (e.g., velocity). On the other hand, efficiency plot 202 illustrates how efficiency may vary, for traditional electric actuators, depending on the applied torque as well as the speed of operation (e.g., velocity).

Plots 200 and 202 illustrate efficiency using varying colors. In particular, as demonstrates by legends 212 and 214, darker colors illustrate higher efficiency while lighter colors illustrate lower efficiency. The efficiency illustrated in plots 200 and 202 may be determined, for example, in terms of calculation of power loss, where higher efficiency may relate to lower power loss as illustrated by legends 212 and 214, and where lower efficiency may relate to higher power loss as illustrated by legends 212 and 214. For instance, power loss may be determined based on input power relative to output power. In cases where the output power is significantly lower than the input power, a high power loss is determined. As such, high power loss (e.g., 0.9 in legends 212 and 214) may indicate low efficiency while low power loss (e.g., 0.1 in legends 212 and 214) may indicate high efficiency. Other examples of determining efficiency may also be possible.

Note that plots 200 and 202 may not be to scale. Also, note that the numbers shown in the plots are shown for illustration purposes only and may refer to normalized data rather than actual data (e.g., normalized speed rather than actual speed).

Plot 200 includes regions 204 and 206. Region 204 of plot 200 illustrates the efficient region of operation in a traditional hydraulic actuator. As shown, region 204 demonstrates that hydraulic actuators may be most efficient while operating at lower speeds regardless of the applied force. On the other hand, region 206 of plot 200 illustrates the inefficient region of operation in a traditional hydraulic actuator. As shown, region 206 demonstrates that hydraulic actuators may be inefficient while operating at higher speeds and applying a lower force.

In contrast, plot 202 includes regions 208 and 210. Region 208 of plot 202 illustrates the efficient region of operation in a traditional electric actuator. As shown, region 208 demonstrates that electric actuators may be most efficient while applying lower torque regardless of the speed of operation. On the other hand, region 210 of plot 200 illustrates the inefficient region of operation in a traditional electric actuator. As shown, region 210 demonstrates that electric actuators may be inefficient while operating at lower speeds and applying a higher torque. Note that the efficient operating envelope of a traditional electric actuator (i.e., region 208)

is generally larger than the efficient operating envelope of a traditional hydraulic actuator (i.e., region 204).

Disclosed herein are various configurations and situations for use of each type of actuator based on the different characteristics and efficiencies of the hydraulic and electric actuators. Each type of actuator may be used in a different joint of robotic system 100. In contrast, both types of actuators may be coupled to the same joint of robotic system 100.

Consider a situation where hydraulic actuator 114 and electric actuator 116 are coupled to different joints of robotic system 100. In an example implementation, electric actuator 116 may be used, for example, when robotic system 100 (e.g., configured as a mobile robot) is walking or otherwise in motion for joints where loads are low and velocities are high. On the other hand, hydraulic actuator 114 may be used, for example, when a mobile robot holds position and experiences higher loads. Consequently, some robot joints may be equipped with hydraulic actuator 114 and thereby configured for holding/supporting higher loads while other robot joints may be equipped with electric actuator 116 and thereby configured for higher speed operation.

For example, knee joints and hip joints in mobile robots may experience high loads since such joints tend to support the body weight of the robot and experience shock loads as the robot moves. As a result, such joints may be equipped with a hydraulic actuator 114. On the other hand, for example, neck joints and wrist joints may frequently move without experiencing high loads. In this case, such joints may be equipped with an electric actuator 116 to allow for efficient operation at high speeds. Note that the example implementation described herein is provided for illustration purposes only.

In a situation where both hydraulic actuator 114 and electric actuator 116 are coupled to the same joint, operation of each actuator may vary depending on various factors. In one case, the electric actuator 116 may be configured for constant operation (e.g., due to having a larger efficient operating envelope) while the hydraulic actuator 114 may be configured to activate and halt actuation depending on various factors. In another case, hydraulic actuator 114 may be configured for constant operation while the electric actuator 116 may be configured to activate and halt actuation depending on various factors. In yet another case, the actuators may operate non-simultaneously and may be used for particular operating conditions (i.e., switching modes). In this case, the hydraulic actuator may be used, for example, for supporting higher loads at a lower velocity while the electric actuator may be used, for example, for higher velocity operation. In yet another case, both actuators may operate at all times. Other examples and combinations may also be possible.

Various factors will now be introduced for controlling operation (e.g., using controller 108) of the hydraulic actuator 114 and the electric actuator 116, where both actuators are coupled to the same joint in robotic system 100. The various factors introduced below may be considered separately or may be considered in combination (e.g., each factor may be weighted differently). Other factors for controlling operation of the hydraulic actuator 114 and the electric actuator 116 may also be possible.

Figure 3:
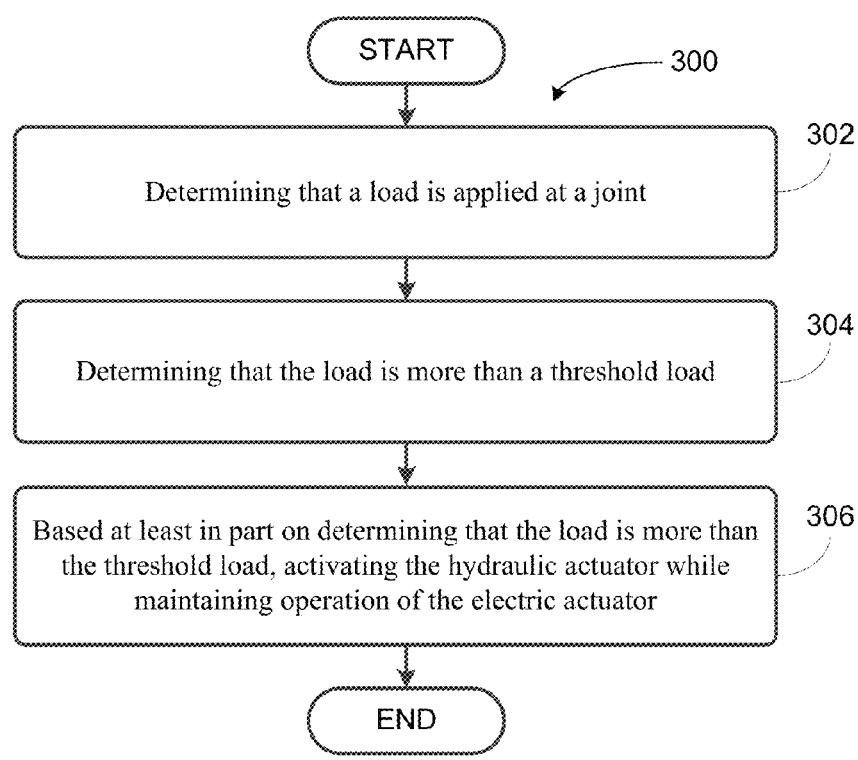
FIG. 3 is an example flowchart for operating a hydraulic actuator and an electric actuator in the robotic system, according to an example embodiment.
Figure 4:
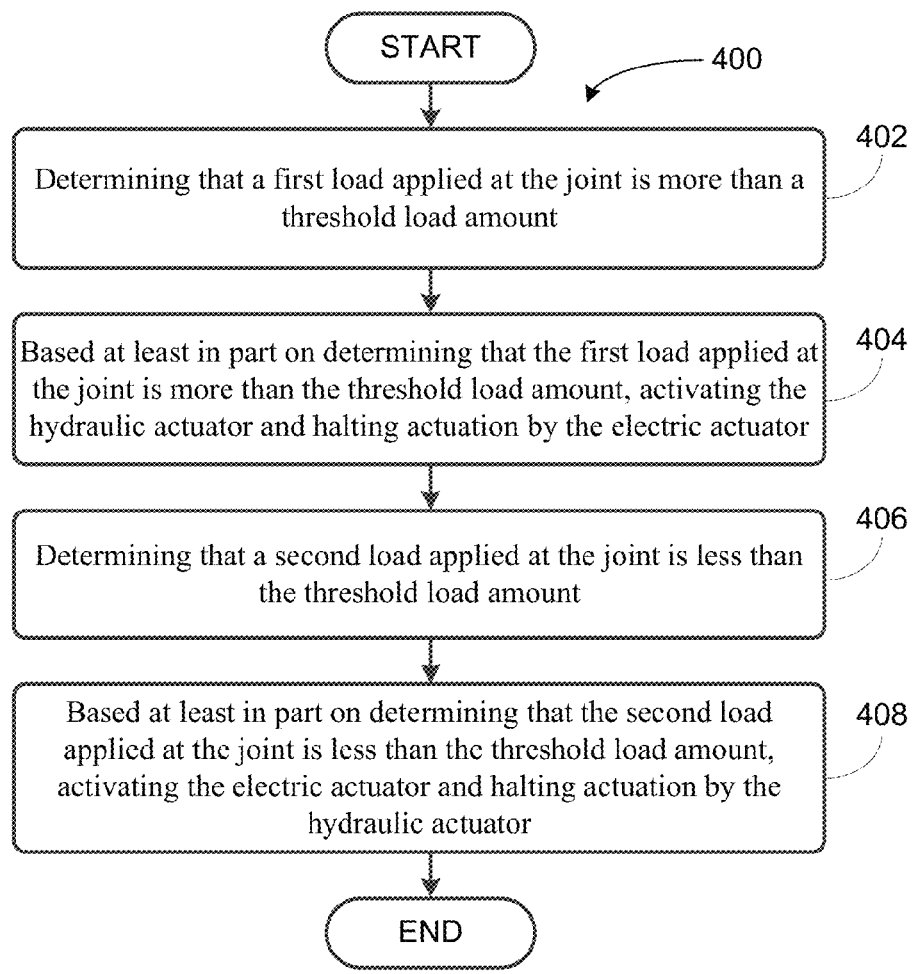
FIG. 4 is a second example flowchart for operating the hydraulic actuator and the electric actuator in the robotic system, according to an example embodiment.

In an example implementation, operation of the hydraulic actuator 114 and the electric actuator 116 may be based at least in part on a load experienced at the joint. The load may be determined using one or more sensor(s) 110, such as a load sensor positioned at or near the joint. To illustrate, consider FIGS. 3 and 4 showing example methods for operation of the actuators based on the load applied at the joint. However, note that the example methods may additionally or alternatively be used in the context of operating efficiency, power loss, and/or operating velocity, among other examples.

FIG. 3 is a flowchart illustrating a method 300, according to an example embodiment. Additionally, FIG. 4 is a flowchart illustrating a method 400, according to an example embodiment. Illustrative methods, such as methods 300 and 400, may be carried out in whole or in part by a component or components in a robotic system, such as by the one or more of the components of the robotic system 100 shown in FIG. 1. However, it should be understood that example methods, such as method 300 and 400, may be carried out by other entities or combinations of entities (i.e., by other computing devices and/or combinations of computing devices), without departing from the scope of the invention.

Method 300 may be operable in robotic system 100, where the electric actuator 116 may be configured for operation (e.g., constant operation), and where controller 108 may be configured to operate the hydraulic actuator 114 and the electric actuator 116 depending on the load applied at the joint.

As shown by block 302, method 300 involves determining that a load is applied at the joint. As discussed above, the load may be determined using one or more sensor(s) 110, such as a load sensor positioned at or near the joint. Note that load measurements may be stored in data storage 104.

As shown by block 304, method 300 involves determining that the load is more than a threshold load. In one case, the threshold load may be predetermined (e.g., based on known manufacture capabilities of the hydraulic actuator 114 and/or electric actuator 116). In another case, the threshold load may be updated over time based on, for example, historical load measurements and/or efficiency of operation for actuators 114 and 116. Other cases and examples may also be possible.

As shown by block 306, method 300 involves, based at least in part on determining that the load is more than the threshold load, activating the hydraulic actuator while maintaining operation of the electric actuator.

As discussed above, the efficient operating envelope of electric actuator 116 may be larger than the efficient operating envelope of a hydraulic actuator 114. As a result, the electric actuator 116 may be configured for constant operation regardless of the load applied at the joint. However, in this case, the hydraulic actuator 114 may be activated when the load applied at the joint exceeds the threshold load, thereby supporting higher loads.

In particular, as discussed above, electric actuator 116 may be inefficient while operating at lower speeds and applying a higher torque. In contrast, hydraulic actuator 114 may be most efficient while operating at lower speeds regardless of the applied force. As such, method 300 may lead to increased efficiency by removing (or reducing) the need for operation of the electric actuator 116 at its inefficient operating envelope of high torque operation. Additionally, since the hydraulic actuator 114 is shock load tolerant compared to the electric actuator 116, method 300 may allow for reduction (or avoidance) of damages to the electric actuator 116 due to shock loads.

In one example, method 300 may be applicable in an example situation where the robotic system 100 is moving and the joint is a knee joint experiencing high loads at times when the leg of the robotic system makes contact with the ground. In another example, method 300 may be applicable where the robotic system 100 is a humanoid robot holding an object in its robotic hand, where the joint is a part of the hand and is experiencing a high load due to the object. Other example situations may also be possible.

Method 400 may be operable in robotic system 100. The hydraulic actuator 114 may be configured to activate when a given load that is more than a threshold load amount is applied at the joint. On the other hand, the electric actuator 116 may be configured to activate when a given load that is less than the threshold load amount is applied at the joint. As such, method 400 may be directed towards switching the mode of operation between operation of the hydraulic actuator 114 and operation of the electric actuator 116 depending on the load applied at the joint. Switching the mode of operation may be carried out by controller 108.

As shown by block 402, method 400 involves determining that a first load applied at the joint is more than a threshold load amount. As discussed above, the load may be determined using one or more sensor(s) 110, such as a load sensor positioned at or near the joint.

As shown by block 404, method 400 involves, based at least in part on determining that the first load applied at the joint is more than the threshold load amount, activating the hydraulic actuator and halting actuation by the electric actuator.

As discussed above in association with FIG. 2, the electric actuator 116 may be inefficient while operating at lower speeds and applying a higher torque. However, as illustrated in FIG. 2, the electric actuator 116 may be efficient while applying a lower torque regardless of the operating speed. As such, blocks 402 and 404 of method 400 may be applicable, for example, during lower speed operation such that actuation by the electric actuator 116 is halted when a high load is applied at joint, thereby avoiding operation of the electric actuator 116 at its inefficient operating envelope (i.e., region 210) and activating the hydraulic actuator 114 for supporting higher loads. Note, however, that method 400 is not limited to lower speed operation.

An example situation for using method 400 (i.e., for blocks 402 and 404) may involve, for instance, the robotic system 100 (e.g., a humanoid robot) in a stationary position and the joint being a knee joint experiencing a higher load due gravity and due to the need to support the body of the robotic system 100. In this example situation, since the speed of operation is low (or zero) it may be desirable to halt actuation by the electric actuator 116 since an electric actuator 116 handling a higher load may require a large power input while resulting in little (or no) mechanical output, thereby leading to inefficiency. However, in this example situation, activation of the hydraulic actuator 114 may be desirable since the hydraulic actuator 114 may require no (or little) additional power input to handle such a high and stationary load. That is, once the desired amount of fluid enters the cylinder of the hydraulic actuator 114, the valve may be closed (e.g., given an electrical signal from controller 108) such that a load may be supported by the hydraulic actuator 114 without using much (or any) additional power. Other example situations may also be possible.

As shown by block 406, method 400 involves determining that a second load applied at the joint is less than the threshold load amount. Note that while method 400 presents the first and second loads as applied at the joint in a particular order, the embodiments disclosed herein are not limited to the loads applied at the joint in any particular order.

As shown by block 408, method 400 involves, based at least in part on determining that the second load applied at the joint is less than the threshold load amount, activating the electric actuator and halting actuation by the hydraulic actuator.

As discussed above in association with FIG. 2, the electric actuator 116 may be most efficient while applying lower torque regardless of the speed of operation. In contrast, the hydraulic actuator 114 may be inefficient while operating at higher speeds and applying a lower force. As such, blocks 406 and 408 of method 400 may be applicable, for example, during higher speed operation such that actuation by the hydraulic actuator 114 is halted when a lower load is applied at joint, thereby avoiding operation of the hydraulic actuator 114 at its inefficient operating envelope (i.e., region 206) and activating the electric actuator 116 for efficiently supporting lower loads. Note, however, that method 400 is not limited to higher speed operation.

An example situation for using method 400 (i.e., for blocks 406 and 408) may involve, for instance, the robotic system 100 (e.g., a humanoid robot) moving its hands and the joint (e.g., being a joint in the hand of the robotic system 100) experiencing a lower load (e.g., when the hand is not holding any objects). In this example situation, since the speed of operation is higher it may be desirable to halt actuation by the hydraulic actuator 114 since a hydraulic actuator 114 operating at a higher speed may require a larger power input for increasing the flow rate of the fluid in the hydraulic actuator 114, thereby leading to inefficiency. However, in this example situation, activation of the electric actuator 116 may be desirable since the electric actuator 116 may efficiently operate at higher speeds (while applying a lower torque) with a relatively lower power input. Other example situations may also be possible.

In an example implementation, the system may be configured to control operation of the actuators 114 and 116 based on desired joint parameters rather than the threshold load considerations discussed above. For instance, such desired joint parameters may include a desired output torque/force of the joint, a desired output velocity of the joint, a desired acceleration of the joint, and/or a desired joint angle, among other possibilities. More specifically, given a model of power consumption as well as a model of the actuators 114 and 116, the robotic system 100 may control operation of the actuators 114 and 116 to obtain the desired joint parameters such that power dissipation in the system is minimized (i.e., maximizing actuation efficiency).

Figure 5:
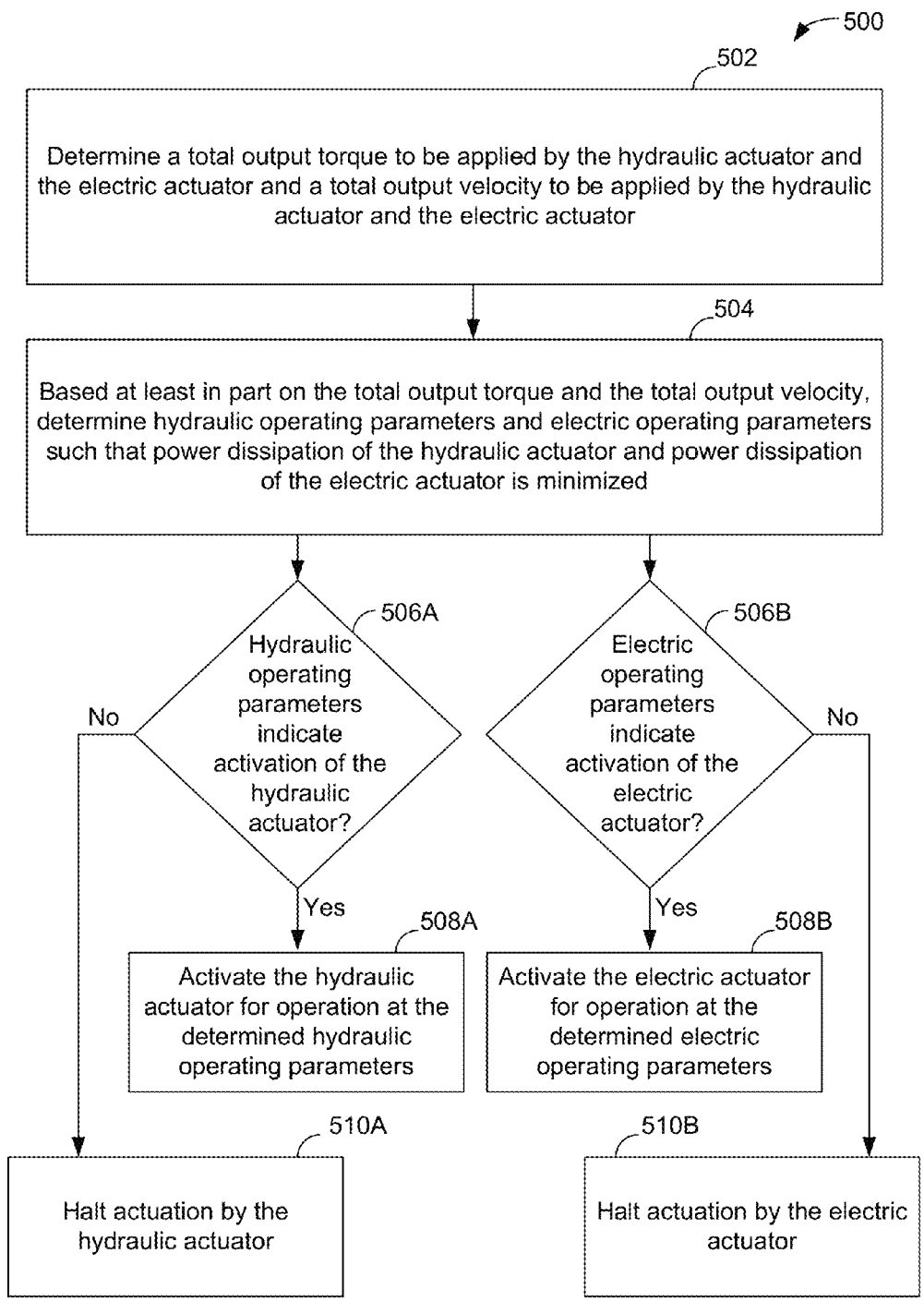
FIG. 5 is a third example flowchart for operating the hydraulic actuator and the electric actuator in the robotic system, according to an example embodiment.

To illustrate, consider FIG. 5 showing a flowchart 500 depicting a method that may be used by the robotic system 100 to efficiently control operation of the actuators 114 and 116 in order to obtain the desired joint parameters. Note that some steps of flowchart 500 may be eliminated and other steps may be added without departing from the scope of the invention disclosed herein. Additionally, note that in other implementations the various steps of flowchart 500 may be carried out in a different order without departing from the scope of the invention disclosed herein.

Step 502 of flowchart 500 involves determining a total output torque to be applied (i.e., a desired output torque/force of the joint) by the hydraulic actuator and the electric actuator and a total output velocity to be applied (i.e., a desired output velocity of the joint) by the hydraulic actuator 114 and the electric actuator 116.

The hydraulic actuator 114 and the electric actuator 116 may work simultaneously (or separately) to drive a joint of the robotic system 100. In particular, the actuators 114 and 116 may drive the joint to achieve certain joint parameters such as a total output torque and a total output velocity. In this manner, the total output torque and the total output velocity cause particular movements of one or more robot links connected to the joint.

One or more components of the robotic system 100, such as processor(s) 102 and/or controller 108, may be configured to determine a total output torque to be applied and a total output velocity to be applied. For instance, the controller 108 may obtain information related the current total output torque and the current total output velocity. Additionally, the controller 108 may obtain environmental information from sensors(s) 110. Given such environmental information, the controller 108 can determine that the current total output torque and the current total output velocity may need to be updated at a future point in time (e.g., in 2 seconds). As a result, the controller 108 may determine a total output torque to be applied and a total output velocity to be applied at a future point in time.

Consider an example scenario where the joint is part of a leg of the robotic system 100 (for simplification purposes, neglecting joint parameters of other joints in the system). In this example scenario, the environmental information may indicate there is an obstacle in the path of the robotic system 100. The controller 108 may then determine that the robotic system 100 must slow down and change its path to avoid a collision with the obstacle. Slowing down may lead to the need for a lower total output velocity of the joint and a higher total output torque, for instance, due to shock loads as the leg of the robotic system 100 contacts the ground. As such, the controller 108 may determine a total output torque to be applied and a total output velocity to be applied at a future point in time (e.g., at an estimated time when the leg of the robotic system 100 contacts the ground). Note that the controller 108 may also determine other joint parameters such as an angle to be applied (e.g., an angle between two robot links connected to the joint) as well as a total output acceleration (or deceleration) to be applied, among others.

Step 504 of flowchart 500 involves, based at least in part on the total output torque and the total output velocity, determining hydraulic operating parameters and electric operating parameters such that power dissipation of the hydraulic actuator 114 and power dissipation of the electric actuator 116 is minimized.

Upon determination of the total output torque to be applied and the total output velocity to be applied, one or more components of the robotic system (e.g., processor(s) 102 and/or controller 108) may determine (e.g., compute) hydraulic operating parameters for the hydraulic actuator 114 and electric operating parameters for the electric actuator 116. The hydraulic and electric operating parameters may be computed such that total power dissipation of the actuators is minimized, thereby maximizing efficiency.

Such a computation may be treated as an optimization problem, among other possibilities. For instance, the controller 108 may obtain program instructions 106 from the data storage 104 that may include a formula (or a set of formulas) representing a particular relationship between the total power dissipation of the actuators, the hydraulic and electric operating parameters, the total output torque to be applied, and the total output velocity to be applied. Given a determined total output torque to be applied and a determined total output velocity to be applied, the formula may be used to determine the hydraulic and electric operating parameters such that the total power dissipation of the actuators (i.e., the power dissipation of the hydraulic actuator 114 in addition to the power dissipation of the electric actuator 116) is minimized. Note that other computational factors may also include power system parameters (i.e., parameters of power source(s) 112), the current total output torque, and the current total output velocity, among others.

Discussed below is an example simplified derivation for a set of example formulas that may be used to determine the hydraulic and electric operating parameters such that the total power dissipation of the actuators is minimized. Note that the example simplified derivation below is discussed for illustration purposed only and should not be seen as limiting. Other example derivations and formulas may also be possible without departing from the scope of the invention. Additionally, note that one or more of the computational factors and assumptions discussed below may be removed while additional computational factors and assumptions may also be considered.

The example simplified derivation may follow a set of assumptions. For instance, an assumption can be made that the joint is driven by the hydraulic actuator 114 and the electric actuator 116 in parallel. Also, for the configuration of the hydraulic actuator 114, it may be assumed that: (1) the hydraulic actuator 114 is one-sided (i.e., can only apply force in one direction), (2) the pressure in the hydraulic actuator 114 is controlled by a valve that can connect the hydraulic actuator 114 to supply and/or return pressure lines, and (3) there is no flow limit in the valve (i.e., the pressure drop across the valve is negligible even at high flows). Additionally, it may be assumed that, for the configurations of the actuators 114 and 116, computational factors such as friction, core losses, and idle losses (e.g., such as the cost of having a motor controller circuit turned on) are negligible. Further, it may be assumed that the only physical limits considered are on (1) the pressure in the hydraulic actuator 114 and (2) a fixed current limit in the electric actuator 116. In particular, the pressure in the hydraulic actuator 114 cannot be negative, the pressure drop across the valve must match the flow across the valve, and the flow is in the direction of declining pressure.

Given the above assumptions, the example simplified derivation includes the following model of the actuators 114 and 116. Consider a total output velocity at the joint ($\omega$). A relationship between the total output velocity ($\omega$) and the output velocity of the electric actuator 116 ($\omega_M$) may be based on the gear ratio of the electric actuator 116 ($G_M$). In particular, the output velocity of the electric actuator 116 ($\omega_M$) may be a product of the gear ratio of the electric actuator 116 ($G_M$) and the total output velocity ($\omega$). i.e., ($\omega_M$)=($G_M$)*($\omega$).

Similarly, a relationship between the total output velocity ($\omega$) and the pressurized fluid flow of the hydraulic actuator 114 (Q) may be based on the effective gear ratio of the hydraulic actuator 114 ($G_H$). In particular, the pressurized fluid flow of the hydraulic actuator 114 (Q) may be a product of the effective gear ratio of the hydraulic actuator 114 ($G_H$) and the total output velocity ($\omega$). i.e., (Q)=($G_H$)*($\omega$). Note that the effective gear ratio of the hydraulic actuator 114 ($G_H$) may be a function of the hydraulic actuator area and mechanical linkages, among other functions, and may vary with position of the piston.

Consider a total output torque at the joint ($\tau$). The total output torque at the joint ($\tau$) may be a product of the torque produced by the electric actuator 116 ($\tau_M$) and the gear ratio of the electric actuator 116 ($G_M$) in addition to a product of the pressure drop in the hydraulic actuator 114 (P) and the effective gear ratio of the hydraulic actuator 114 ($G_H$). i.e., ($\tau$)=($G_M$)*($\tau_M$)+($G_H$)*(P). Note that the total output torque ($\tau$) may include the torque needed to accelerate the electric actuator 116 and the electric actuator 116 gearbox.

Given the above assumptions, power dissipation in the actuators 114 and 116 can be modeled as follows. In particular, the following model of power dissipation includes resistive power dissipation of the electric actuator 116 ($W_E$) and hydraulic power dissipation (i.e., throttling losses) of the hydraulic actuator 114 ($W_H$). However, note that other derivations may also consider other power losses in the system.

The torque produced by the electric actuator 116 ($\tau_M$) may be a product of a torque constant of the electric actuator 116 ($K_T$) and the current applied to the electric actuator 116 (I). i.e., $(\tau_M)=(K_T)*(I)$. Additionally, the resistive power dissipation of the electric actuator 116 ($W_E$) may be a product the resistance of the electric actuator 116 (R) and the current applied to the electric actuator 116 (I) squared. i.e., $(W_E)=(I)^2*(R)$. As such, the resistive power dissipation of the electric actuator 116 ($W_E$) may be determined as follows: $(W_E)=(\tau_M/K_T)^2*(R)$ In order to determine the hydraulic power dissipation of the hydraulic actuator 114 ($W_H$), the pressure in the pressure rail ($P_S$) to which the hydraulic actuator 114 is connected must be considered. In an example hydraulic system flow follows pressure. In particular, if the pressurized fluid flow of the hydraulic actuator 114 (Q) is larger than zero (Q>0) then the pressure ($P_S$) may be larger than the pressure drop in the hydraulic actuator 114 (P). In contrast, if the pressurized fluid flow of the hydraulic actuator 114 (Q) is smaller than zero (Q<0) then the pressure ($P_S$) may be smaller than the pressure drop in the hydraulic actuator 114 (P). As such, the pressure ($P_S$) can be selected as supply pressure ($P_{supply}$) (i.e., high pressure) or return pressure ($P_{return}$) (i.e., low pressure). Note that ($P_S$) may be assumed or selected to be fixed.

The hydraulic power dissipation of the hydraulic actuator 114 ($W_H$) may be determined as a product of the pressurized fluid flow of the hydraulic actuator 114 (Q) as well as the difference between the pressure in the pressure rail ($P_S$) and the pressure drop in the hydraulic actuator 114 (P). i.e., $(W_H)=(Q)*((P_S)-(P))=((G_H)*(\omega))*((P_S)-(P))$.

Given the resistive power dissipation of the electric actuator 116 ($W_E$) and hydraulic power dissipation of the hydraulic actuator 114 ($W_H$), the total power dissipation ($W_{total}$) can be determined. In particular, the total power dissipation ($W_{total}$) can be determined by adding the resistive power dissipation of the electric actuator 116 ($W_E$) to the hydraulic power dissipation of the hydraulic actuator 114 ($W_H$).

i.e., $(W_{total})=(W_H)+(W_E)=[(\tau_M/K_T)^2*(R)]+[((G_H)*(\omega))*((P_S)-(P))]$ Given the above assumptions and formulas, various optimization techniques (currently known or developed in the future) can be used to maximize efficiency of the system. In particular, given a desired output torque (i.e., a total output torque ($\tau$) to be applied) and a desired output velocity (i.e., a total output velocity ($\omega$) to be applied), the optimization techniques may be used to determine hydraulic operating parameters (e.g., (Q), (P), and ($P_S$)), electric operating parameters (e.g., ($\tau_M$) and ($\omega_M$)), and power system parameters (e.g., (I)) such that the total power dissipation ($W_{total}$) is minimized.

Note that some of the computational factors discussed above may be constant (e.g., ($G_M$), ($G_H$), ($K_T$), and (R)). Additionally, note that other hydraulic operating parameters not discussed above may include the pump motor temperature, chamber pressures, and position of the piston. Further, note that another electric operating parameter not discussed above may include the electric actuator temperature. Yet further, note that other power system parameter not discussed above may include (assuming the power source 112 is a battery) voltage, state of charge, and battery temperature. Other parameters and computational factors may also be possible.

Step 506A of flowchart 500 involves determining whether the hydraulic operating parameters indicate activation of the hydraulic actuator 114. Additionally, step 506B of flowchart 500 involves determining whether the electric operating parameters indicate activation of the electric actuator 116.

Figure 6:
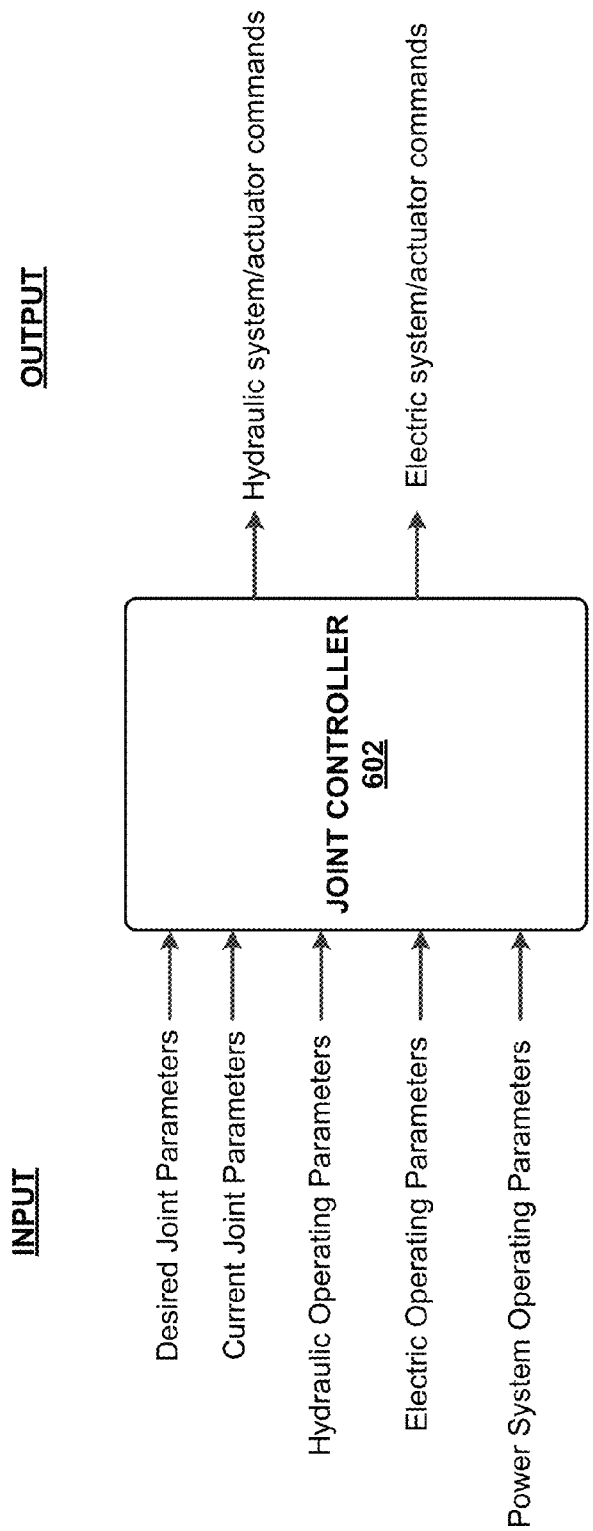
FIG. 6 illustrates an example joint controller, according to an example embodiment.

To illustrate, consider FIG. 6 showing a joint controller 602. In one case, joint controller 602 may be part of (or the same as) controller 108. In another case, joint controller 602 may be separate from controller 108 and may be positioned, for example, at a joint of the robotic system 100. Additionally, in some implementations, joint controller 602 may carry out the optimization techniques discussed above. In another implementation, other components of the robotic system 100 (e.g., controller 108 and/or processor(s) 102) may carry out the optimization techniques discussed above and may subsequently send, to joint controller 602, information related to the determined parameters (as shown under "input" in FIG. 6). Other implementations may also be possible.

Upon receiving information related to the determination of the hydraulic operating parameters, the joint controller 602 may determine whether the hydraulic operating parameters indicate activation of the hydraulic actuator 114. As illustrated by step 508A, if the joint controller 602 determines that the hydraulic operating parameters indicate activation of the hydraulic actuator 114 (e.g., pressurized fluid flow (Q) is determined to be a non-zero value), the joint controller 602 may send hydraulic system/actuator commands (as shown under "output" in FIG. 6) to activate the hydraulic actuator 114 for operation at the determined hydraulic operating parameters. Such hydraulic system/actuator commands may include, for example, mode selection for hydraulic actuation (e.g., selecting direction of motion and/or force level) as well as metering (e.g., control valve port opening). Other commands may also be possible.

Note that if the hydraulic actuator 114 is already configured for operation then the commands may include an indication to maintain operation of the hydraulic actuator 114 while operating the hydraulic actuator 114 at the determined hydraulic operating parameters.

In contrast, as illustrated by step 510A, if the joint controller 602 determines that the hydraulic operating parameters indicate halting actuation by the hydraulic actuator 114 (e.g., pressurized fluid flow (Q) is determined to be a zero value), the joint controller 602 may send hydraulic system/actuator commands to halt actuation by the hydraulic actuator 114.

Note that if the actuation by the hydraulic actuator 114 has already been halted (i.e., not configured for operation), then the commands may include an indication to continue halting actuation by the hydraulic actuator 114.

As mentioned above, step 506B of flowchart 500 involves determining whether the electric operating parameters indicate activation of the electric actuator 116. Upon receiving information related to the determination of the electric operating parameters, the joint controller 602 may determine whether the electric operating parameters indicate activation of the electric actuator 116. As illustrated by step 508B, if the joint controller 602 determines that the electric operating parameters indicate activation of the electric actuator 114 (e.g., output velocity of the electric actuator 116 ($\omega_M$) is determined to be a non-zero value), the joint controller 602 may send electric system/actuator commands (as shown under "output" in FIG. 6) to activate the electric actuator 116 for operation at the determined electric operating parameters. Such electric system/actuator commands may include, for example, current, torque, speed, and/or position commands. Other commands may also be possible.

Note that if the electric actuator 116 is already configured for operation then the commands may include an indication to maintain operation of the electric actuator 116 while operating the electric actuator 116 at the determined electric operating parameters.

In contrast, as illustrated by step 510B, if the joint controller 602 determines that the electric operating parameters indicate halting actuation by the electric actuator 116 (e.g., output velocity of the electric actuator 116 ($\omega_M$) is determined to be a zero value), the joint controller 602 may send electric system/actuator commands to halt actuation by the electric actuator 116.

Note that if the actuation by the electric actuator 116 has already been halted (i.e., not configured for operation), then the commands may include an indication to continue halting actuation by the electric actuator 116.

In this manner, the joint controller 602 may receive information related to current joint parameters (e.g., current total output torque and current total output velocity), desired joint parameters (e.g., total output torque to be applied and total output velocity to be applied), hydraulic operating parameters, electric operating parameters, and power system operating parameters. Given such parameters, the joint controller 602 may send commands (e.g., to the actuators 114 and 116) such that the joint parameters transition from operating at the current joint parameters to operating at the desired joint parameters at maximum efficiency (i.e., minimizing total power dissipation).

Figure 7A:
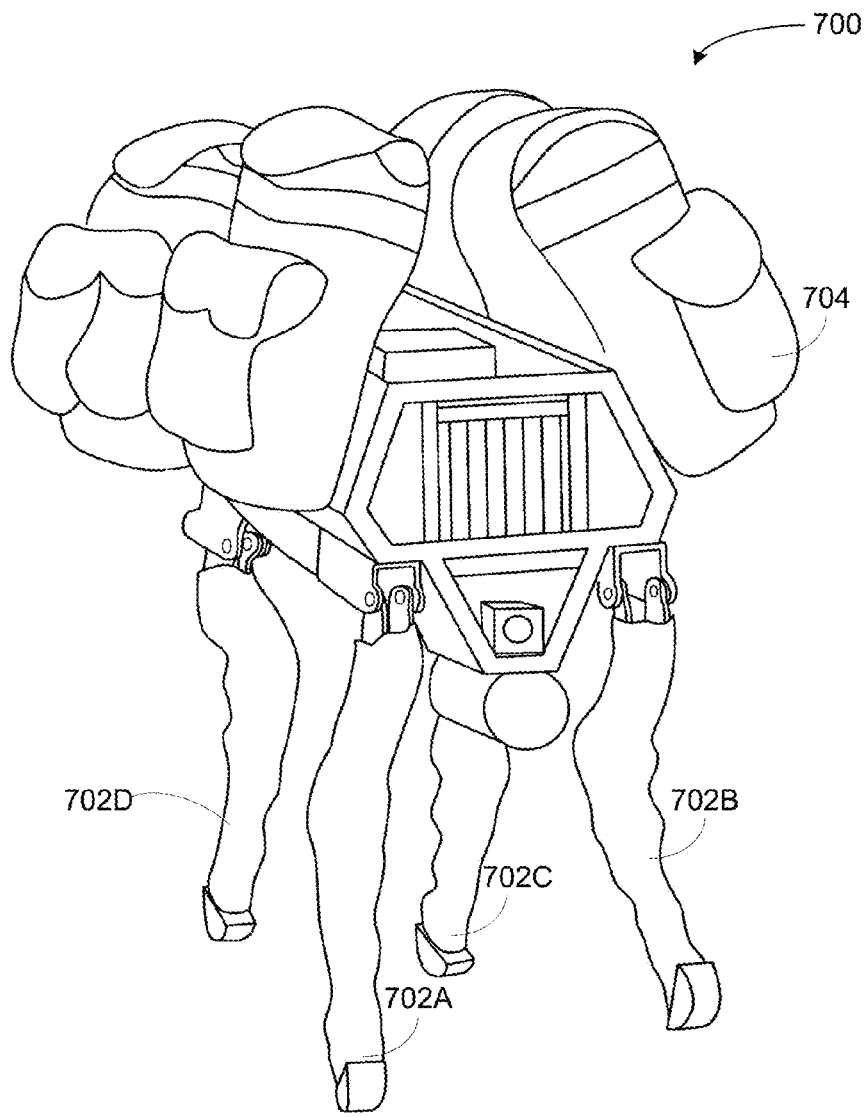
FIG. 7A illustrates an example quadrupedal robot, according to an example embodiment.

Reference will now be made to additional factors that may be considered for operation (i.e., activation and halting actuation) of the actuators 114 and 116. Such additional factors may be considered in addition or alternatively to the considerations discussed above in association with methods 300 and 400 as well as flowchart 500. To illustrate the additional factors, consider FIG. 7A showing an example robot 700. Note that robot 700 may include any of the components of robotic system 100 as well as joint controller 602. Also, note that methods 300 and 400 as well as flowchart 500 discussed above may be implemented in robot 700.

As shown in FIG. 7A, robot 700 is a quadrupedal robot with four legs 702A-D. Robot 700 is shown as carrying several objects 704. Note that while the following factors are discussed in the context of the quadrupedal robot 700, the embodiments may be applied to any type of robotic system.

Figure 7B:
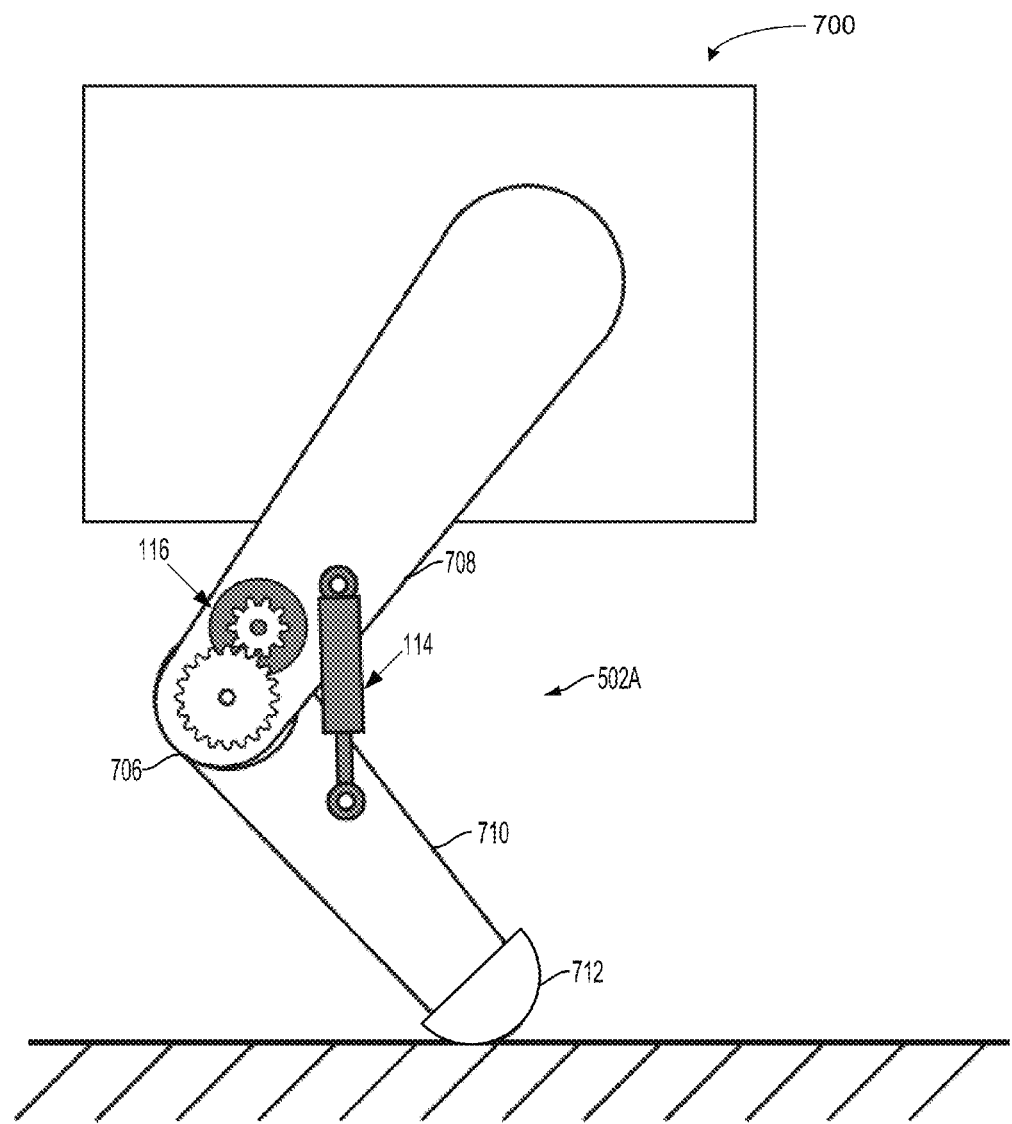
FIG. 7B illustrates a side view of the example quadrupedal robot, according to an example embodiment.

FIG. 7B shows a side view of robot 700. Leg 702A (as well as legs 702B-D not shown in FIG. 7B) includes thigh member 708 and shin member 710 connected at joint 706. Hydraulic actuator 114 and electric actuator 116 are coupled to joint 706 to cause movement of shin member 710 about joint 706. Foot 712 is shown as connected to the bottom of shin member 710 and is configured to contact the ground during movement of the robot 700.

Figure 8A:
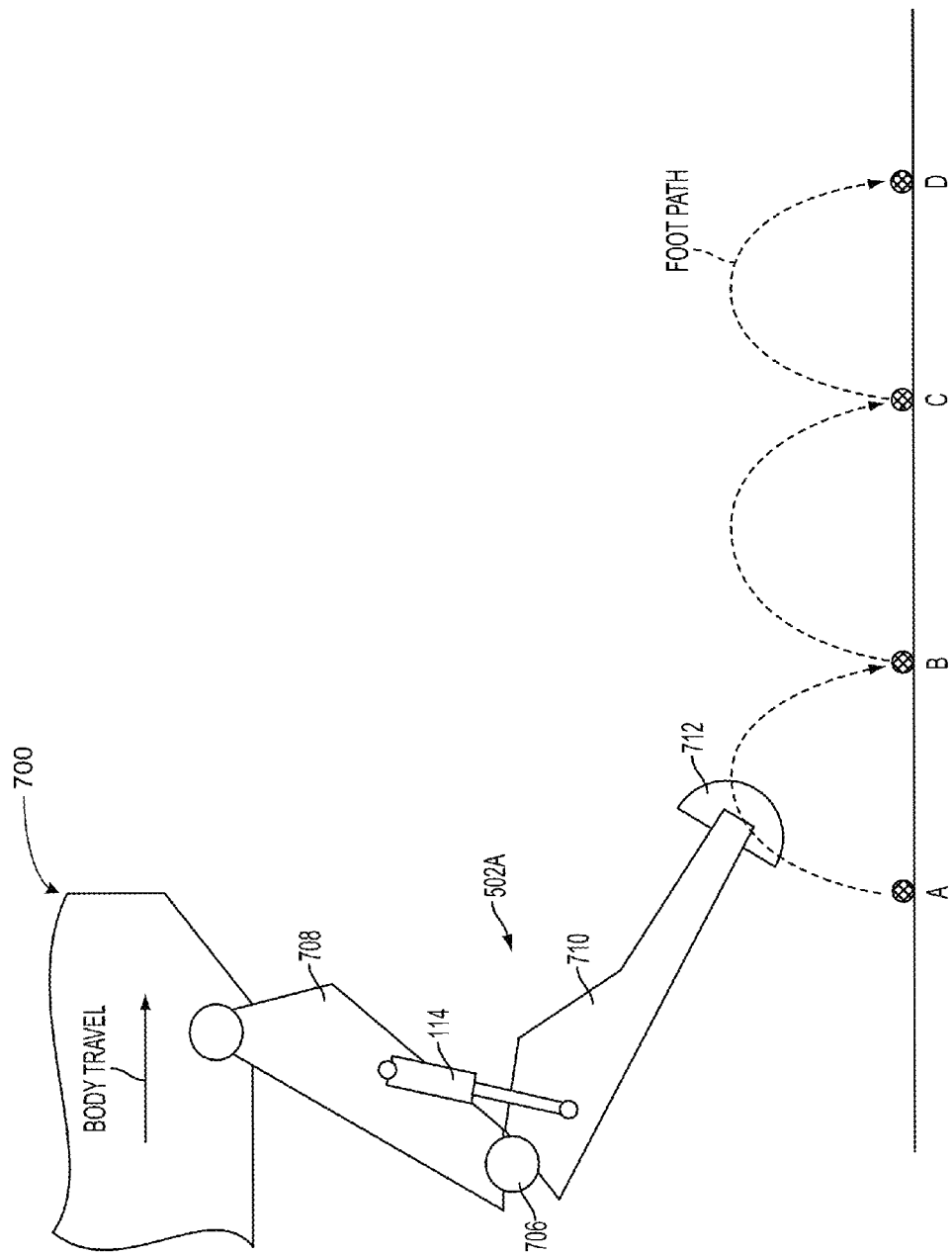
FIG. 8A illustrates the side view of the example quadrupedal robot at a first point in time, according to an example embodiment.

Consider FIG. 8A showing the side view of robot 700 first illustrated in FIG. 7B, where the robot 700 is traveling in the direction illustrated in FIG. 8A. Note that the electric actuator 116 is not shown in FIG. 8A. Additionally, FIG. 8A shows the "foot path" of leg 702A over time. In particular, the "foot path" shows the travel path of foot 712 over time including contact points A-D indicating the points where foot 712 contacts the ground.

FIG. 8A illustrates a point in time when leg 702A is "in the air" (i.e., does not contact the ground). A sensor, such as a force sensor, may be positioned on the leg 702A (e.g., on foot 712) and may be configured to determine that the leg 702A is not in contact with the ground (e.g., given force data from the force sensor indicating no force). Based on such a determination, the system may activate the electric actuator 116 and halt actuation by the hydraulic actuator 114. This may be desirable since a higher speed of operation is taking place with a lower load experienced at the joint, thereby allowing for efficient use of the electric actuator 116. Note that the electric actuator 116 may remain activated as long as the leg 702A is "in the air".

Figure 8B:
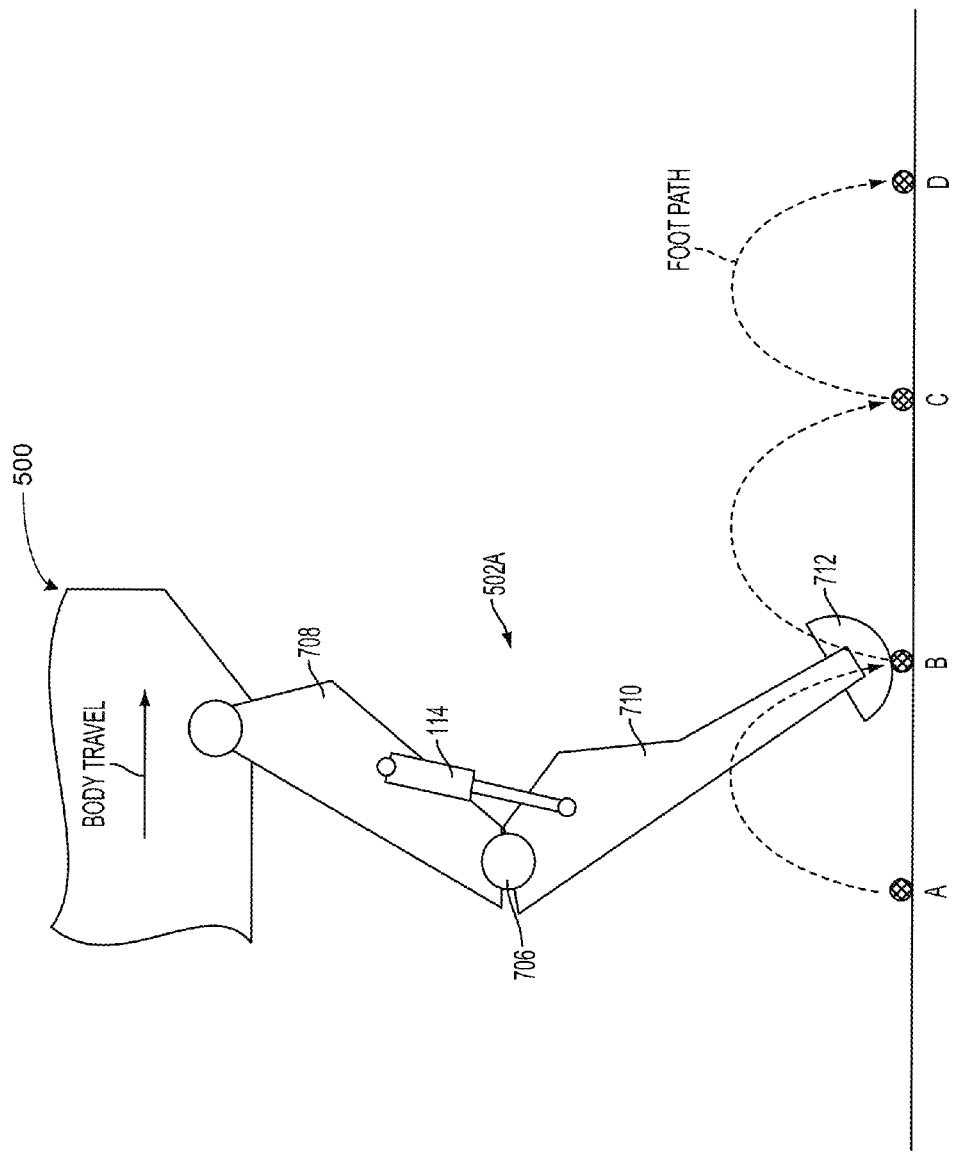
FIG. 8B illustrates the side view of the example quadrupedal robot at a second point in time, according to an example embodiment.

Consider FIG. 8B showing the side view of robot 700 as first illustrated by FIG. 8A but at a later point in time. As illustrated by FIG. 8B, foot 712 contacts the ground (i.e., at contact point B) at the later point in time. In this case, the force sensor may be configured to determine that the leg 702A contacts the ground (e.g., given force data from the force sensor indicating a threshold amount of force). Based on determining that the leg 702A contacts the ground, the system may activate the hydraulic actuator 114 and maintain operation of the electric actuator 116. This may be desirable since a higher load is applied at joint 706, thereby allowing for efficient use of the hydraulic actuator 114. Note that the hydraulic actuator 114 may remain activated as long as the leg 702A is in contact with the ground. Additionally, note that actuation by the electric actuator 116 may be halted (while maintaining operation of the hydraulic actuator 114) when the joint 706 is holding the robot 700 mass against gravity (i.e., supporting the body weight of the robot 700).

In a further aspect, the system is configured to determine when the leg 702A loses (or about to lose) contact with the ground. Such a determination can be made, for example, given the force data from the force sensor transitioning from indicating the threshold amount of force to indicating no force. Based on determining that the leg 702A loses (or about to lose) contact with the ground, the system may activate the electric actuator 116 and halt actuation by the hydraulic actuator 114.

In yet a further aspect, consider again FIG. 8A showing the leg 702A "in the air". In some cases, the system may be configured to estimate (or calculate) the point in time (and/or location) of contact with the ground. For example, robot 700 may include a proximity sensor position on the leg 702A (e.g., on foot 712) and configured to determine a distance between the leg and the ground (e.g., given a particular return signal of electromagnetic radiation emitted from the proximity sensor). Additionally, robot 700 may also include a motion sensor (e.g., positioned at joint 706) configured to determine a velocity for the movement of the leg 702A.

Given proximity data from the proximity sensor and velocity data from the motion sensor, the system can estimate (or calculate) the point in time (and/or location) of contact with the ground. Based on determining that the leg will contact the ground at the calculated time, the system may activate the hydraulic actuator 114 and maintain operation of the electric actuator 116. Such operation of the actuators may occur in advance (i.e., before the calculated time) or at the calculated time.

Figure 9:
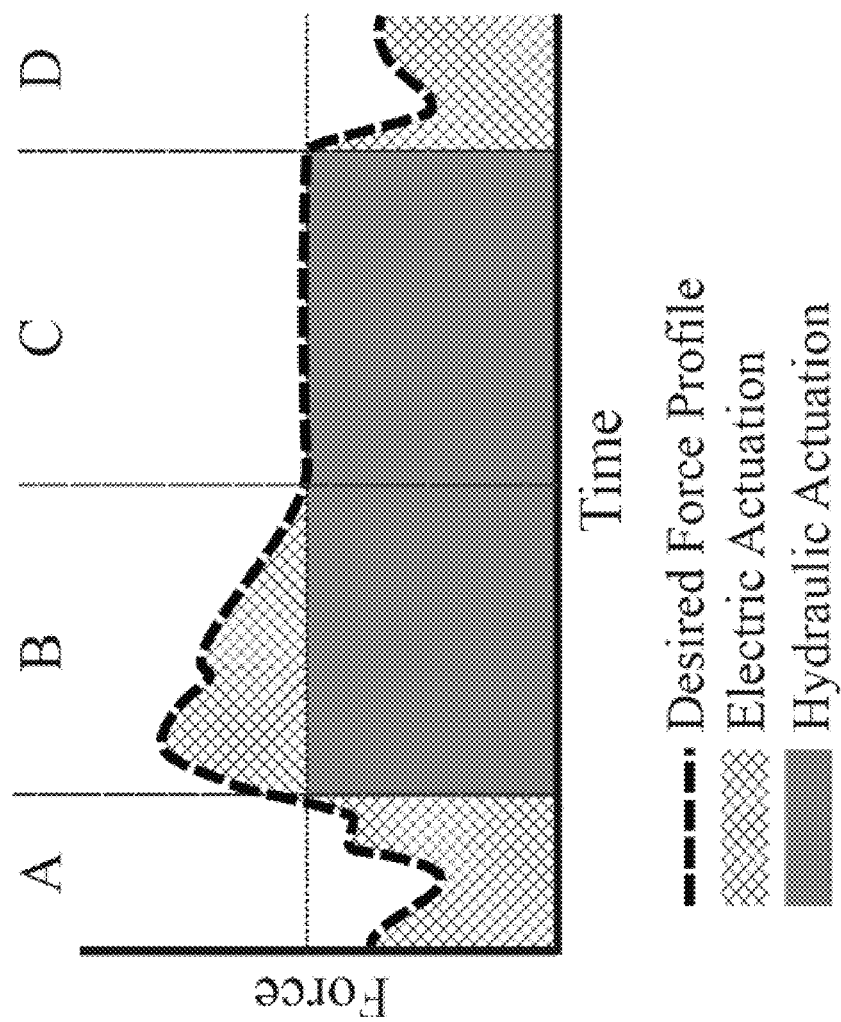
FIG. 9 illustrates an example desired force profile, according to an example embodiment.

To further illustrate the sequence of events discussed above in association with FIGS. 8A-8B, consider FIG. 9 showing an example output force/torque profile of the knee joint 706 over time. In particular, FIG. 9 shows a desired output force profile over time and illustrates how a hydraulic actuation in addition to electric actuation may be used to meet the desired force profile. Note that the example force profile is shown for illustration purposes only and is not meant to be limiting.

Region A of FIG. 9 illustrates the point in time when leg 702A is "in the air" (i.e., does not contact the ground). As mentioned above, robot 700 may determine that the leg 702A is not in contact with the ground. Based on such a determination, the system may activate the electric actuator 116 and halt actuation by the hydraulic actuator 114. As illustrates in region A, the operating range of the electric actuator 116 may be shifted in order to meet the desired force profile while the leg 702A is "in the air". In particular, the output force of the electric actuator 116 is configured to match the desired force profile of the joint 706 while actuation by the hydraulic actuator 114 is halted.

Region B of FIG. 9 illustrates the point in time when the leg 702A contacts the ground at the later point in time. In particular, region B illustrates the desired force profile when the knee 706 experiences a high load while contacting the ground, such as a shock load. As mentioned above, based on determining that the leg 702A contacts the ground, the system may activate the hydraulic actuator 114 and maintain operation of the electric actuator 116. As illustrates in region B, the hydraulic actuator 114 may be activated (e.g., operating range shifted with a metering valve) to assist the electric actuator 116 to meet the desired force profile. More specifically, as illustrated, the hydraulic actuator 114 may provide discrete force levels while the electric actuator 116 may be used for sufficient force tracking by supplying the sufficient amount of additional force necessary to meet the desired force profile.

Region C of FIG. 9 illustrates the point in time when leg 702A contacts the ground and when the joint 706 is holding the robot 700 mass against gravity. As mentioned above, when the joint 706 is holding the robot 700 mass against gravity, actuation by the electric actuator 116 may be halted while maintaining operation of the hydraulic actuator 114. As illustrated in region C, in order to meet the desired force profile when the joint 706 is holding the robot 700 mass against gravity, a discrete level force produced by the hydraulic actuator 114 (e.g., using binary valve control (on/off)) may be sufficient without actuation by the electric actuator 116.

Region D of FIG. 9 illustrates the point in time when the leg 702A loses contact with the ground. As mentioned above, based on determining that the leg 702A loses contact with the ground, the system may activate the electric actuator 116 and halt actuation by the hydraulic actuator 114. As illustrated in region D, operation of the actuators is similar to the operation of the actuators as discussed above in association with region A. In particular, the output force of the electric actuator 116 is configured to match the desired force profile of the joint 706 while actuation by the hydraulic actuator 114 is halted.

In yet a further aspect, operation of the actuators may be based on required velocity for movement of the leg 702A. For example, robot 700 may want to travel at a particular speed, thereby requiring a particular velocity for movement of leg 702A (or particular members of leg 702A). If the required velocity exceeds a threshold velocity, the system may activate the electric actuator 116 and halt actuation by the hydraulic actuator 114. This may be desirable since, as discussed above in association with FIG. 2, hydraulic actuator 114 may inefficient at higher speeds while the electric actuator 116 may be efficient at higher speeds.

In contrast, if the required velocity is lower than the threshold velocity, the system may activate the hydraulic actuator 114 and halt actuation by the electric actuator 116. This may be desirable since, as discussed above in association with FIG. 2, the hydraulic actuator 114 may be efficient at lower speeds regardless of the applied force while the electric actuator 116 may be efficient at lower speeds only when a lower torque is applied. Note that, in some cases, if the required velocity is lower than the threshold velocity then both actuators may be activated. Other examples and combinations may also be possible.

In an example embodiment, operation of the actuators may also be based on determination of shock loads. In particular, shock loads may be evaluated (e.g., using load data from the load sensor) as a larger load experienced over a shorter period of time. As such, based on determining that a shock load is applied at the joint, the system may activate (or maintain operation of) the hydraulic actuator 114 and activate (or maintain operation of) the electric actuator 116.

In one example, such shock loads may be experienced, for example, when leg 702A contacts the ground at a particular speed. In another example, such shock loads may be experienced when a robotic system 100 inadvertently loses control and falls to the ground, thereby resulting in a large impact with the ground. In this example, the hydraulic actuator 114 may be activated in response to a determination that the robotic system 100 has lost control and is about to hit the ground. Such a determination can be made, for example, using proximity sensing and/or shock load sensing as discussed above as well as information received from controller 108 indicating a loss of balance for the robotic system 100.

In an example embodiment, operation of the actuators may also be based on a determination that a particular part (e.g., hand or a joint) of the robotic system 100 is static and/or that the robotic system 100 is stationary. In one example, a determination can be made that the robotic system 100 is stationary. Based on such a determination, the system may activate the hydraulic actuator 114 and halt actuation by the electric actuator 116. In another example, where the joint is part of a hand of the robotic system 100, a determination can be made that the hand (or the joint) is static (i.e., not moving). Based on a determination that the hand is static, the system may activate the hydraulic actuator 114 and halt actuation by the electric actuator 116. In another case, both actuators may be activated in response to such a determination. Note that such a determination can be applied in the context of any part of the robotic system 100.

In an example embodiment, operation of the actuators may also be based on a determination that one or more objects (e.g., objects 704 in FIG. 7A) are carried by the robotic system 100 (e.g., supported by a joint of the robotic system 100). For example, in the case of a humanoid robot, such an object may be carried in the hand of the humanoid robot (e.g., while the humanoid robot is stationary or while the humanoid robot is in motion). A determination that one or more objects are carried by the robotic system 100 can be made using one or more sensors 110, such as a load sensor and/or a touch sensor, among others. Based on a determination that one or more objects are carried by the robotic system 100 (and/or supported by the joint of the robotic system), the system may activate the hydraulic actuator 114 and halt actuation by the electric actuator 116. In another case, both actuators may be activated in response to such a determination. Other examples and combinations may also be possible.

A hydraulic actuator 114 and an electric actuator 116 positioned on the same joint may additionally remove the need for clutches and brakes on the electric actuator 116. For example, consider a situation when a humanoid robot holds a box in its hand. If the joints in the humanoid robot's arms are only equipped with electric actuators, then power may be drained while the humanoid robot holds the box. In such cases, the electric actuator 116 may be equipped with clutches and/or breaks to lock out the electric actuator 116 gearbox such that no (or little) additional power input is needed to hold the box (i.e., the load). However, the presence of a hydraulic actuator 114 in addition to the electric actuator 116 allows the hydraulic actuator 114 to hold the load with no (or minimal) power drain, thereby removing the need for clutches and/or brakes.

Further, a hydraulic actuator 114 and an electric actuator 116 positioned on the same joint may allow for high frequency control adjustments by the electric actuator 116. In particular, the electric actuator 116 may be used to add control fidelity to the discrete level switching of the hydraulic actuator 114, thereby reducing throttling losses and reducing bandwidth requirements for valving in the hydraulic actuator 114. More specifically, the hydraulic actuator 114 may be connected to a discretized multi-pressure rail system and an on/off valve control such that discrete force levels are produced. Whereas, the electric actuator 116 may supply sufficient force to "smooth out" the discrete force level produced by the hydraulic actuator 114 so that the desired force profile is met efficiently.

Figure 10:
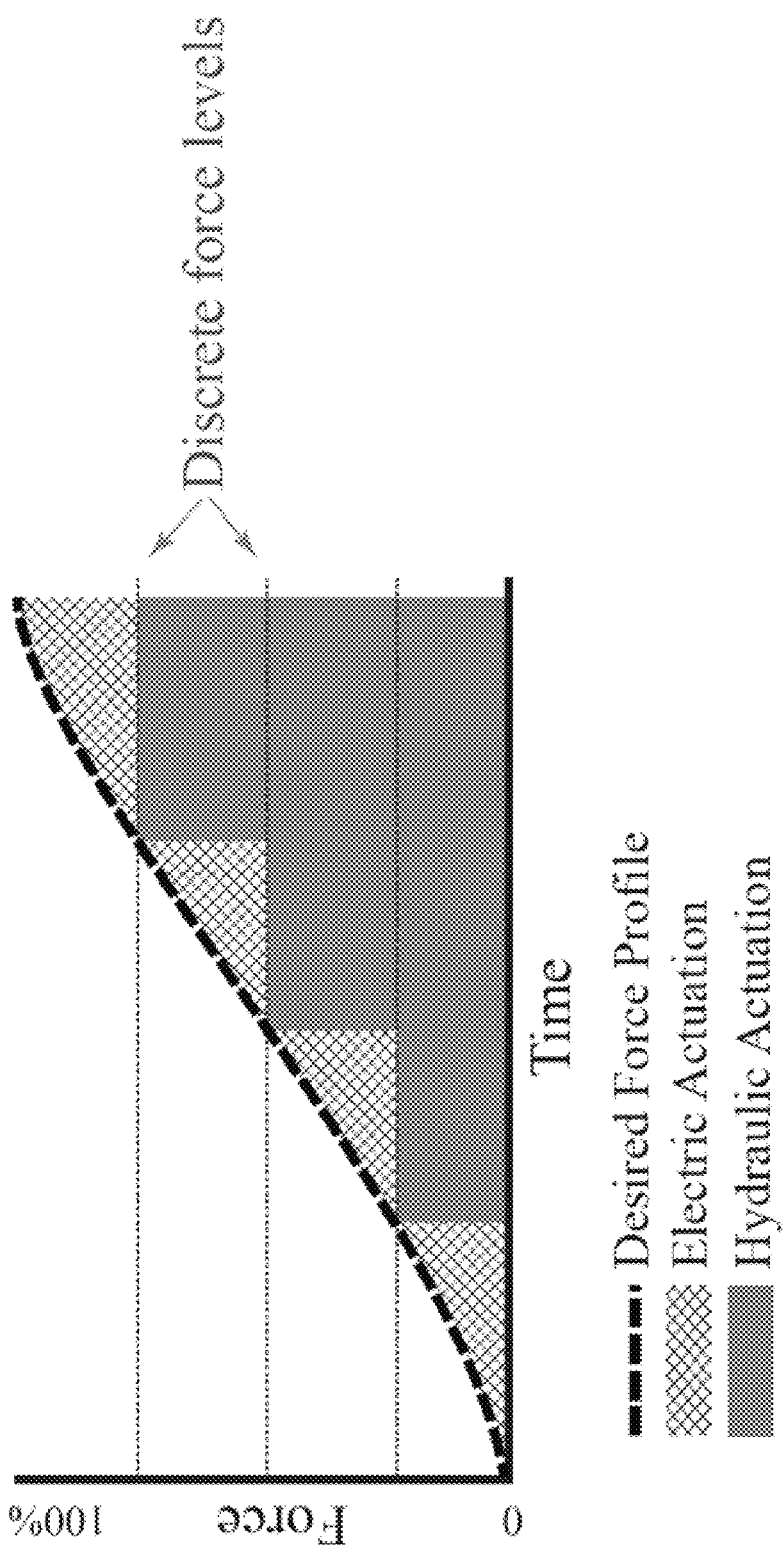
FIG. 10 illustrates a second example desired force profile, according to an example embodiment.

To illustrate, consider FIG. 10 showing another desired force profile over time. Note that the force profile shown in FIG. 10 is shown for illustration purposes only and is not meant to be limiting. As shown in FIG. 10, the hydraulic actuator 114 is configured to apply discrete force levels such that the discrete force level are as close as possible to meeting the desired force profile. The electric actuator 116 may then be used to provide any necessary actuation (e.g., in addition to the hydraulic actuation) to track the desired force profile while maintaining maximal efficiency of the system.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A system comprising:
   a hydraulic actuator coupled to a joint of a robotic device;
   an electric actuator coupled to the joint of the robotic device;
   a sensor configured to measure a load applied at the joint; and
   a controller configured to:
      determine a total output velocity to be applied by the hydraulic actuator and the electric actuator;
      determine hydraulic operating parameters and electric operating parameters based on the load applied at the joint and the total output velocity;
      determine whether the load applied at the joint is greater than a threshold load;
      determine whether the total output velocity is less than a threshold velocity; and
      when the load applied at the joint is greater than the threshold load and the total output velocity is less than the threshold velocity:
         activate the hydraulic actuator to operate at the hydraulic operating parameters; and
         halt actuation by the electric actuator.

2. The system of claim 1, wherein the controller is further configured to, when the load applied at the joint decreases to a value less than the threshold load and the total output velocity is greater than the threshold velocity:
   deactivate the hydraulic actuator to halt operating at the hydraulic operating parameters; and
   active the electric actuator to operate at the electric operating parameters.

3. The system of claim 1, further comprising a power system configured to supply power to the hydraulic and electric actuators, wherein the controller is further configured to:
   determine power system parameters based the load applied at the joint and the total output velocity; and
   operate the power system according to the determined power system parameters.

4. The system of claim 3, wherein the power system parameters comprise one or more of the following parameters: a current, a voltage, a state of charge, and a battery temperature.

5. The system of claim 1, wherein the hydraulic operating parameters comprise one or more of the following parameters: a pressurized fluid flow of the hydraulic actuator, a pressure drop in the hydraulic actuator, and a pressure in a pressure rail to which the hydraulic actuator is connected.

6. The system of claim 1, wherein the electric operating parameters comprise one or more of the following parameters: an output torque to be applied by the electric actuator and an output velocity to be applied by the electric actuator.

7. The system of claim 1, wherein the controller is further configured to determine a total power dissipation by the hydraulic actuator and the electric actuator, the total power dissipation comprising a sum of a resistive power dissipation of the electric actuator and a hydraulic power dissipation of the hydraulic actuator.

8. The system of claim 7, wherein the resistive power dissipation of the electric actuator is a product of a resistance of the electric actuator and a square of a current supplied to the electric actuator.

9. The system of claim 7, wherein the hydraulic power dissipation of the hydraulic actuator is a product of a pressurized fluid flow of the hydraulic actuator and of a difference between a pressure in a pressure rail to which the hydraulic actuator is connected and a pressure drop in the hydraulic actuator.

10. The system of claim 1, wherein determining hydraulic operating parameters and electric operating parameters is further based at least in part on one or more of the following constant values: a gear ratio of the electric actuator, an effective gear ratio of the hydraulic actuator, a torque constant of the electric actuator, and a resistance of the electric actuator.

11. A robotic system comprising:
a joint;
a hydraulic actuator coupled to the joint;
an electric actuator coupled to the joint;
a sensor configured to measure a load applied to the joint;
a processor; and
data storage hardware in communication with the processor, the data storage hardware storing program instructions that when executed on the processor cause the processor to perform operations comprising:
determining a total output velocity to be applied by the hydraulic actuator and the electric actuator;
determining hydraulic operating parameters and electric operating parameters based on the load applied at the joint and the total output velocity;
determining whether the load applied at the joint is greater than a threshold load;
determining whether the total output velocity is less than a threshold velocity; and
when the load applied at the joint is greater than the threshold load and the total output velocity is less than the threshold velocity:
activating the hydraulic actuator to operate at the hydraulic operating parameters; and
halting actuation by the electric actuator.

12. The robotic system of claim 11, wherein the operations further comprise, when the load applied at the joint decreases to a value less than the threshold load and the total output velocity is greater than the threshold velocity:
deactivating the hydraulic actuator to halt operating at the hydraulic operating parameters; and
activating the electric actuator to operate at the electric operating parameters.

13. The robotic system of claim 12, further comprising a power system configured to supply power to the hydraulic and electric actuators, wherein the operations further comprise:
determining power system parameters based the load applied at the joint and the total output velocity; and
operating the power system according to the determined power system parameters.

14. A method comprising:
receiving, at a controller, a measured load applied to a joint of a robotic device from a sensor in communication with the controller;
determining, by the controller, a total output velocity to be applied by a hydraulic actuator and an electric actuator, the hydraulic actuator and the electric actuator both coupled to the joint of the robotic device;
determining, by the controller, hydraulic operating parameters and electric operating parameters based on the load applied at the joint and the total output velocity
determining, by the controller, whether the load applied at the joint is greater than a threshold load;
determining, by the controller, whether the total output velocity is less than a threshold velocity; and
when the load applied at the joint is greater than the threshold load and the total output velocity is less than the threshold velocity:
activating, by the controller, the hydraulic actuator to operate at the hydraulic operating parameters; and
halting, by the controller, actuation by the electric actuator.

15. The method of claim 14, further comprising, when the load applied at the joint decreases to a value less than the threshold load and the total output velocity is greater than the threshold velocity:
deactivating, by the controller, the hydraulic actuator to halt operating at the hydraulic operating parameters; and
activating, by the controller, the electric actuator to operate at the electric operating parameters.

* * * * *